United States Patent [19]

Dibble et al.

[11] Patent Number: 4,668,388
[45] Date of Patent: May 26, 1987

[54] HIGH RATE SLUDGE REACTOR

[75] Inventors: John T. Dibble, Nederland; William R. Deever; Lloyd J. Parcell, both of Beaumont, all of Tex.; Rudolph C. White, Annandale, Va.

[73] Assignee: Texaco Inc., White Plains, N.Y.

[21] Appl. No.: 555,312

[22] Filed: Nov. 25, 1983

[51] Int. Cl.⁴ ............................................. C02F 3/12
[52] U.S. Cl. ................................. 210/150; 210/170; 210/177; 210/290; 210/617; 210/604; 210/612
[58] Field of Search ............... 210/747, 603, 609, 612, 210/613, 617, 620, 807, 177, 218, 180, 184, 290, 266, 170, 205, 150, 170, 604

[56] References Cited

U.S. PATENT DOCUMENTS 3,876,546  4/1975  Hsiung et al. .................. 210/290
4,086,167  4/1978  Tapola et al. .................. 210/170
4,192,742  3/1980  Bernard et al. ................. 210/617
4,401,441  8/1983  Chase ............................. 210/613

Primary Examiner—David L. Lacey
Attorney, Agent, or Firm—Jack H. Park; Kenneth R. Priem; Richard A. Morgan

[57] ABSTRACT

A high rate reactor for the treatment of biosludge has been designed which combines the processes of landfarming, sand bed dewatering, and forced aeration composting. The reactor is essentially a sand bed overlying a drainage system housed in an inflatable, pressurized building.

The high rate reactor can effectively treat biosludge through dewatering and biodegradation. Volume reduction, stabilization, and solidification are achieved at improved rates over conventional practices. The reactor operates independent of climate and is a closed system minimizing environmental monitoring.

7 Claims, 4 Drawing Figures

HIGH RATE SLUDGE REACTOR

BACKGROUND OF THE INVENTION

1. Field of the Invention

This invention relates to a reactor for dewatering and aerobically biodegrading organic and oily sludges.

2. Description of the Prior Art

Composting is a thermophilic biological process used for the treatment of municipal sludges. Many composting systems are available, but the process almost always involves mixing the sludge with a bulking agent and then using forced aeration to eliminate noxious odors caused by anaerobic decay and to maintain sufficient oxygen so that the elevated temperatures necessary to the composting process can be obtained. Oily sludges can be composted; however, it has been shown that no decomposition rate advantage is obtained over ambient aerobic processes that dispose of oily sludges.

Landfarming is an economical and widely used method for the disposal of organic and oily sludges. This method involves applying sludge to soil and tilling the soil to allow aerobic bacteria to convert the organic fraction into carbon dioxide, water, and humic matter. Frequent tilling of the soil allows air to diffuse to the bacteria preventing anaerobic conditions and the subsequent formation of odorous products.

Although environmentally sound, landfarming has certain disadvantages. Landfarms are open systems. Their operation has an effect on the soil, air and groundwater at the treatment site. Governmental regulations have been put in place to minimize any negative impact of landfarming on the environment. These regulatory limitations on the oil loading rate based on heavy metals or nitrogen concentration can dictate the size or lifetime of a landfarm. Odor generation or the proximity of groundwater supplies may restrict the location of a landfarm. To demonstrate that a landfarm is not adversely affecting the environment, soil, unsaturated zone, and groundwater monitoring must be performed. This is costly and time consuming.

Climate also has an influence on landfarm operations. Cool temperatures slow biological activity. Frozen or muddy soil makes sludge application difficult or impossible by preventing tilling or limiting access of equipment to the landfarm. Excessive soil moisture also limits oxygen transfer.

There is a continuing and until now unsatisfied need for an apparatus to dewater and degrade sludge, particularly low solids content sludge, in an environmentally non-interactive manner. The apparatus must economically handle large volumes of dilute, oily or organic sludges.

DETAILED DESCRIPTION OF THE DRAWINGS

Figure 1:
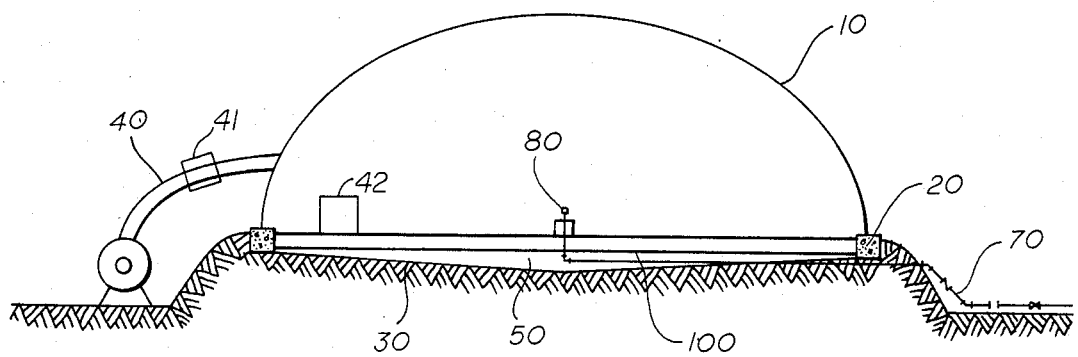
FIG. 1 is a schematic cross section view showing a typical arrangement of a reactor vessel and bed.

In order to better describe the invention, attention is brought to the drawings. Referring to FIG. 1 is a cross-section view showing a typical arrangement of a reactor vessel and bed. An air supported cover 10 is fastened to an encircling frame 20. A base 30 is attached to the frame 20. The base 30 is oil resistant, water impermeable, and formed such that it collects water. Air supply means 40 supplies optionally heated air to support the cover 10 and to supply air to the bed 100. Air is heated by heating means 41.

The bed 100 is of granular matter of mesh sufficient to retard the passage of biosludge solids and sufficient to allow the passage of water and supplied air. Water is collected at the base 30 and removed by water removal means (not shown).

Means for introducing low solids content biosludge 70 into the vessel is shown and is attached to means for distributing biosludge 80, in this drawing a spray nozzle. Biosludge is distributed across the top of the bed 100 and tilled into the bed by tilling means 42.

Figure 2:
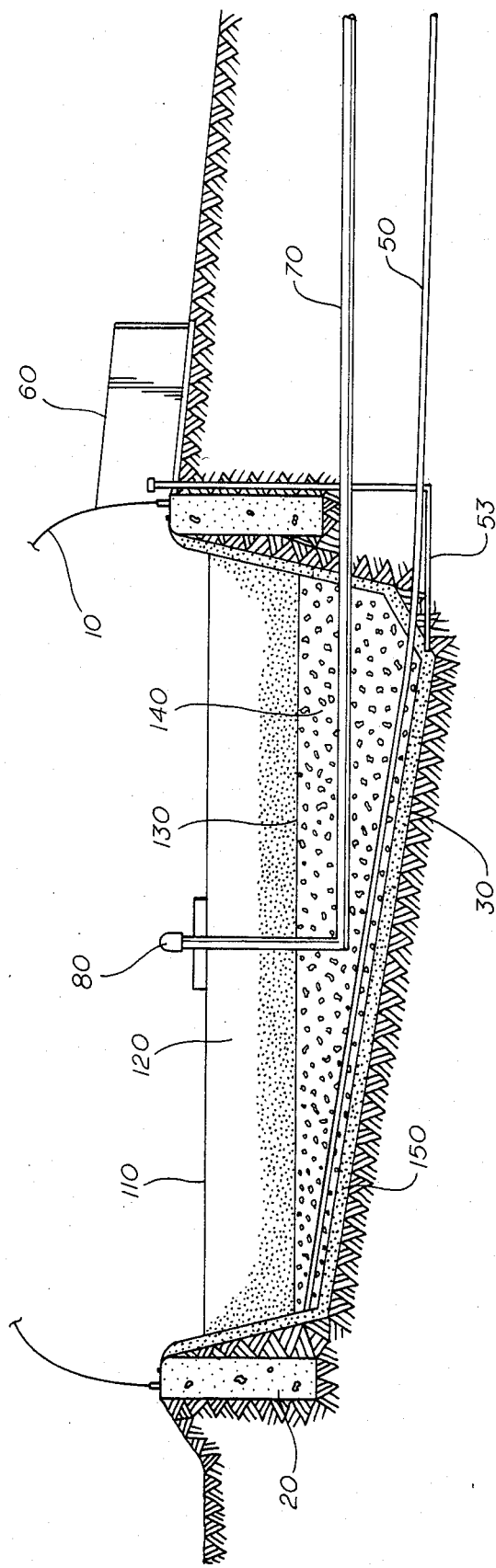
FIG. 2 is schematic cross section showing a typical reactor bed arrangement and typical drainage system.

FIG. 2 shows a cross section view of a typical reactor bed and drainage system. A top layer 110 consists of biosludge that has been distributed across the top of the bed and tilled with granular matter from a second layer 120. The second layer 120 is granular matter ranging from 0.05 mm to 0.5 mm diameter such that it retains solid biosludge but passes water and air therethrough. A drainage cloth 130 below the third layer retards the passage of granular matter from the second layer 120, but allows the passage of water and air to a fourth layer 140. The fourth layer 140 is granular matter of 1 mm to 5 mm diameter in which is positioned water removal means 50.

During loading, vacuum may be applied to water removal means 50 by vacuum means (not shown) to assist and speed dewatering.

In this embodiment, the second layer is a 2 foot layer of sand and the fourth layer is a 1 to 3 foot layer of pea gravel. The depth of the entire bed is about 5 feet. Below the membrane liner, in this embodiment, is a 6 inch layer of sand 150 between the membrane liner and the earth.

Figure 3:
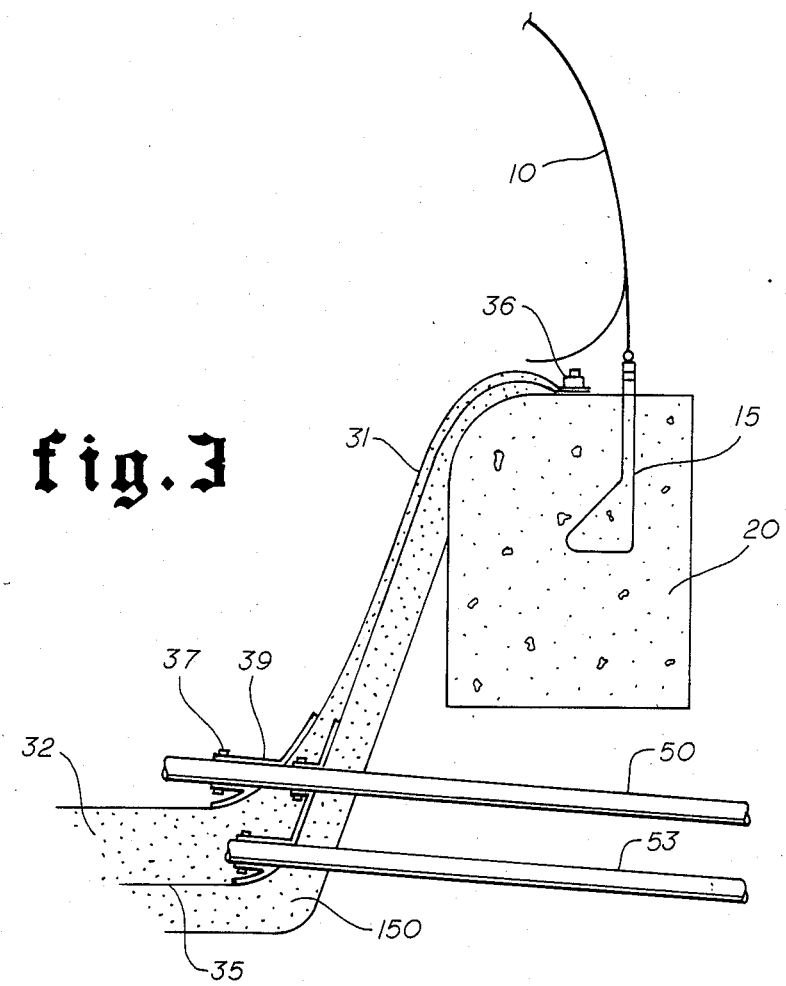
FIG. 3 is a schematic cross section showing a typical fastening system.

FIG. 3 is a schematic cross-section showing a typical fastening system. The cover 10 is fastened to the frame 20 in this case a concrete ring. The cover 10 is fastened to the frame 20 by fastening means 15, in this case a hot dipped galvanized steel concrete anchor. The cover 10 extends inside the vessel to form an air tight seal.

The base 30 is a membrane liner made up of a primary liner 31 and a secondary liner 35. The primary liner 31 is two plys of 30 mil PVC sheet. The secondary liner 35 is a single sheet of PVC sheet. Between the two liners is in this case a ½ inch layer of sand 32. In fluid communication with the sand is a leachate monitor 53 in this case a 4 inch PVC pipe. The drain 50 in this case 8 inch PVC pipe at a slope of 1½ inch per 100 feet protrudes through the primary and secondary liners 31 and 35 to the bed 100 (not shown). The drain 50 and leachate monitor 53 are sealed to the primary and secondary liners 31 and 35 with steel bolts 37, steel clamps (not shown) and boots 39. The primary and secondary liners 31 and 35 are fastened to the frame 20 by fastening means in this case concrete anchor bolts 36 and a 4 inch wide ×⅜ inch deep metal bar (not shown), to form an air tight seal.

Figure 4:
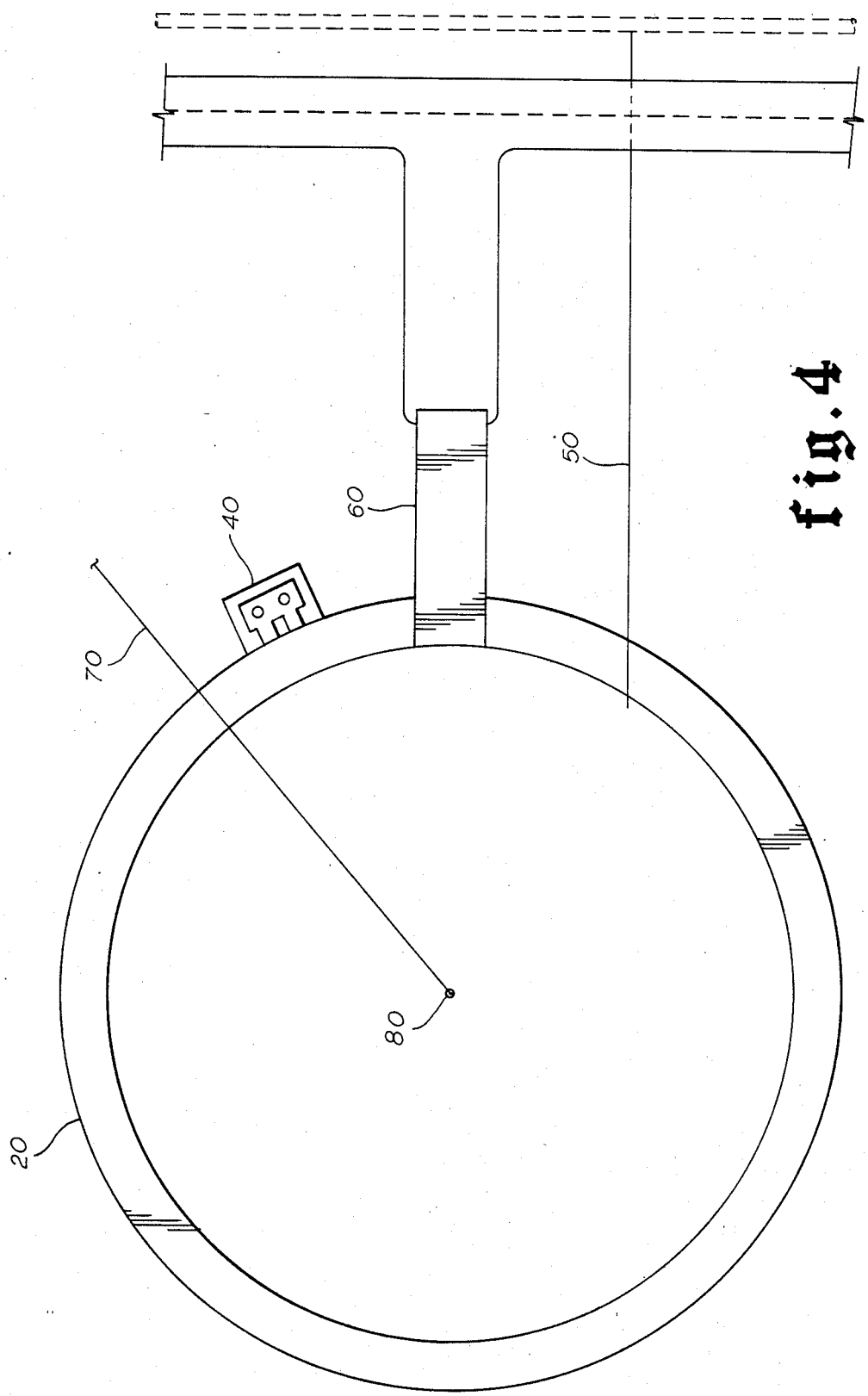
FIG. 4 is an overhead view showing a typical vessel arrangement.

FIG. 4 is an overhead view of FIG. 1.

The figure shows frame 20, air supply means 40 and sludge removal means 60, which in thise case is a vehicle air lock.

Sludge is introduced to the vessel through means 70 and distributed through distributing means 80. Water is collected by the base 30 (not shown) and removed from the vessel by water removal means 50.

SUMMARY OF THE INVENTION

The present invention is a high rate reactor for dewatering and aerobically biodegrading low solids content biosludge. The reactor comprises a closed, air tight vessel and a bed positioned within the vessel. The vessel comprises an air supported cover and a water impermeable, oil resistant base both fastened to a rigid frame. The bed comprises granular matter which is tilled with the biosludge. The granular matter is of sufficient mesh to retain solid matter but to allow the passage of air and water therethrough. An air supply supports the cover, pressures water through the bed and supplies greater than stoichiometric air for biological decomposition of the dewatered biosludge.

DESCRIPTION OF THE PREFERRED EMBODIMENTS

Although generally successful, landfarming has certain disadvantages. First, a large area of land is required. Secondly, the rate of decomposition decreases in cool weather. Thirdly, excessive rainfall reduces the transport of oxygen into the soil lowering the decomposition rate and can cause odors generated by anaerobic decay. Fourthly, air emissions from freshly applied sludge cannot be controlled. Fifthly, leachate from the landfarm into the groundwater is not easily controlled.

The limitations and restrictions of landfarming are a result of a landfarm being in intimate contact with the environment. By isolating a landfarm so completely from the environment that it becomes a large reactor, these limitations and restrictions are minimized. The high rate reactor of the present invention places a landfarm in a closed system. By closing the landfarm, conditions of operation can be controlled and optimized.

The high rate sludge reactor consists of a bed overlaying a drainage system and housed in an inflatable building. This process for the treatment of biosludge is based on a synergistic combination of concepts drawn from landfarming, forced aeration composting, and sand bed dewatering.

As in sand bed dewatering, the biosludge is taken directly from a clarifier, thickener, or holding tank at less than five percent solids and applied to the surface of optionally a sand bed. The biosludge is applied to the bed by spraying or other means. Normally, a sand bed works as a gravity filter. The pressure of the inflatable building adds positive pressure to the filter and speeds dewatering. The leachate is collected in the drainage system and returned to the wastewater treatment plant. The pressure above the bed results in an air flow through the bed to the drainage system. This ventilation of the bed has a drying effect which allows more frequent biosludge application.

The present invention is a high rate sludge reactor for dewatering and aerobically biodegrading low solids content biosludge. The reactor comprises a closed, air tight vessel and a bed positioned within the vessel. The vessel is uniquely adapted for its function. The vessel comprises a cover fastened and sealed to an encircling frame and a base fastened and sealed to the frame. The cover is an air supported structure and may be a building, a plastic cover, inflatable structure, etc. In the alternative, the structure may be a rigid structure that will hold pressure such as a metal building or converted cone roof tank. The inflatable structure may be a dome or rectangle or any shape convenient to the available space. The cover should be made of a strong, pliable material which is inflated by internal air pressure. The design load the structure will bear is specified by local building codes, with an 80 mph wind load factor being typical. A typical structure is stress relieved by the addition of heavy duty web reinforcement straps sewn across the seams, and attached to each fastening point. Stresses in the skin are transferred to the web strap, and down to each fastening point. Low elongation polyester is a suitable webbing. The cover is firmly secured to the frame by fastening means to resist the lift forces developed by the inflation pressure and wind loading. The structure may additionally be secured with steel cables secured under the web straps. In this case the steel cables form an additional net under the web straps. The cables can be fastened to the frame by anchors, bolts, hooks and eyes, straps, etc. The cover is sealed to the frame by sealing means, such as air seal flaps, seals, caulking, glue, etc. around the perimeter of the structure to prevent air loss at the juncture of the cover and frame.

The cover is supported by air supply means which additionally supplies greater than stoichiometric air to the bed. Typical internal pressure is only several inches of water above atmospheric supplied by electric blowers, fans, etc. with a suitable back-up in case of power failure. Additionally, supplied air may be heated if desired by heating means such as fired heaters, heat lamps, etc. in climates where freezing conditions would impair performance. Although the process of aerobic degradation produces heat, the flow of fresh air through the bed carries away generated heat and ambient temperature in the vessel is increased only by radiant heat gains and that supplied by heating means.

The frame is an encircling frame in order to hold air pressure for supporting the cover. It is horizontally rigid to maintain the integrity of the cover and must be constructed to withstand stresses transferred to it from the cover. Concrete is the material of choice for large structures and when this material is used, concrete anchors may serve as fastening means. Wooden frames have been used in smaller pilot apparatus.

The base must be water impermeable and oil resistant so as to isolate the vessel contents from the environment. The base is fastened and sealed to the frame by fastening means and sealing means. The base may be made from any appropriate materials of construction such as concrete, plastic film, etc. A particularly economical and effective base is a membrane liner. This can be made from sheets of polyethylene or polyvinyl chloride. In one embodiment the membrane liner consists of two liners, the second barrier below the first with porous medium placed between them so that leaks in the first barrier can be detected. In this embodiment, the top membrane is polyvinyl chloride sheet 60 mils thick and the bottom membrane is polyvinyl chloride sheet 30 mils thick. The leak detector is referred to as a leachate monitoring system. The leachate monitor detects damage to the membrane liner that would allow the passage of water past the membrane liner and into the environment, rather than to water removal means. Below the membrane liner, in this embodiment is a 6 inch layer of sand between the membrane liner and the earth.

The base is formed in the shape so as to collect water from the bed. In the drawing is shown a configuration wherein the base is constructed so that water flows to a dip or sump for removal by water removal means. Water removal means may be by gravity flow through a pipe with a water seal. Perforated PVC pipe works nicely. Water may alternately be pumped out.

The vessel is provided with means for introducing biosludge. Means for distributing the biosludge may also be provided. The means may be a single spray nozzle, multiple spray nozzles, over flow troughs, perforated pipe or any other means for distributing the biosludge essentially evenly over the top of the bed. To assist in dewatering during system loading, vacuum may be applied at the drainage system. Tilling means is used to till the biosludge into the bed. This is most conveniently accomplished with a rototiller, plough, hoe and other means used in the art.

The bed itself may be one of several embodiments. In a first embodiment, the bed is granular matter sufficient to retard the passage of solid biosludge and sufficient to allow the passage of supplied air and water therethrough. The granular matter may be preferably sand. It may alternatively be gravel, anthracite, shells, plastic beads, clay, broken brick, wood chips or other material that can be tilled with the biosludge and thereby bulk it and expose it to the supplied air.

In a second embodiment, the bed consists of:

a first layer which is the top layer comprising biosludge which is tilled with granular matter of 0.05 to 0.5 mm;

a second layer directly beneath the first layer comprising granular matter of 0.5 mm to 1 mm diameter; and a third layer directly beneath the second layer comprising granular matter of 1 mm to 5 mm diameter.

A preferred second layer comprises sand and the preferred third layer comprises gravel.

In a third embodiment, the bed consists of:

a first layer which is the top layer comprising biosludge distributed across the top of the bed which is tilled with a second layer;

a second layer directly beneath the first layer comprising granular matter of 0.05 to 0.5 mm diameter;

a third layer directly beneath the second layer, comprising means for retarding the passage of granular matter and allowing the passage of water to a forth layer; and a fourth layer comprising granular matter of 1 mm to 5 mm diameter into which is positioned water removal means.

The second layer is preferably sand, the third layer drainage fabric and the fourth layer gravel. Drainage fabric is any one of a number of commercially available geotextile fabrics used to retain granular matter while passing water. A mesh approximately that of burlap fabric, works well.

As biosludge accumulates on the sand bed surface, the surface pores blind-off and drainage is impaired. Rather than remove the biosludge layer by scraping, the surface is rejuvenated by tilling the biosludge into the sand bed as in landfarming. In landfarming, biosludge is tilled into the upper soil horizon to insure adequate aeration. Because of the sand bed ventilation, the depth to which biosludge is incorporated is not restricted. A deeper zone of incorporation provides for maximum use of the surface area available.

The high rate sludge reactor is not exposed to the environment as is a landfarm. Climate, therefore, becomes less of a consideration. Temperature is kept warm by a greenhouse effect or heating by heating means to promote rapid biodegradation of organics and evaporation of moisture. Since precipitation is excluded, hydraulic limitations will be determined only by the water fraction of the biosludge. The reactor is not in contact with the soil nor groundwater. Regulatory considerations and environmental monitoring are minimized.

If the sand is considered a bulking agent, the high rate reactor is similar to a forced aeration composting system. Sludge dewatering, however, is required prior to composting but not for the high rate reactor. The high rate reactor will not self-heat because of the comparatively low loading rate and high ventilation.

The biosludge mixed into the sand bed will undergo biodegradation. Normally, aeration is a limiting factor to the rate of biosludge biodegradation. The bed ventilation ensures aerobic conditions prevail, promoting rapid biodegradation and avoiding odor generation. One third to one-half of the organic fraction of the biosludge is mineralized to carbon dioxide and water. The remainder is converted to stable, humus-like matter which accumulates. The inorganic fraction of the biosludge also accumulates. Thus, the volume of the bed increases slowly with time.

Overall, the process results in a substantial reduction in the volume and mass of biosludge. The quality of the biosludge is changed from a watery, unstable sludge to a friable sandy material. The residual material is stored in the bed extending the interval between ultimate disposal from days to years. The finished material should not be a hazardous waste, will be suitable for fill, and may actually be of potting soil quality.

The High Rate Reactor is further compared to composting and landfarming in Table I.

TABLE I

| PARAMETER | COMPOSTING | | LANDFARMING | |
| --- | --- | --- | --- | --- |
| | ARRATED PILE | REACTOR | CONVENTIONAL | HIGH-RATE REACTOR |
| COMPARISON OF COMPOSTING, LANDFARMING, AND HIGH RATE SLUDGE REACTOR | | | | |
| Operating Comditions Temperature: | Elevated | Elevated | Ambient | Ambient |
| Bulking Agent Required: | Yes/No* | Yes/No* | No | No** |
| Solids Reduction Weight %: | 25/75* | 25/75* | Not Applicable | 33** |
| Blowdown/Sludge: | 1.5–0.5* | 1.5–0.5* | Not Applicable | 1.0 |
| Blowdown Required: | Daily | Daily | None | Uncertain Est.; Yearly |
| Hydraulic Limits: (No Bulking Agent) | Low | Low | Low-High | High (Decrease |

TABLE I-continued

| PARAMETER | COMPOSTING | | LANDFARMING | |
| --- | --- | --- | --- | --- |
| | ARRATED PILE | REACTOR | CONVENTIONAL | HIGH-RATE REACTOR |
| | | | | With Time) |
| Sludge Dewatering Requirements: | High | High | None | None |
| Land Area Required: | Medium | Low | High | Med–Low |
| Odor Release Problems: | Yes | Slight–None | Some | Slight–None |
| Leachate Controlled: | Yes | Yes | No | Yes |
| Labor Requirements: | Intensive | Medium | Very Low | Low |
| Material Handling Equipment, | | | | |
| Amount: | High | High | Low | Medium |
| Usage: | High | Low | Low | Low |
| Outside Effects, | | | | |
| Temperature: | None | None | Very Much | None |
| Rainfall: | Some | None | Very Much | None |
| Snowfall: | Some | None | Very Much | None |
| Availability of Bulking Agent: | Difficult | Difficult | None | None |
| Disposal of Blowdown: | Difficult | Difficult | Not Applicable | Unknown |
| COMPARISON OF COMPOSTING, LANDFARMING, AND HIGH RATE REACTOR | | | | |
| Materials Handled, | | | | |
| Biological Sludge: | Yes | Yes | Yes | Yes |
| Oily Sludge: | Not Well | Not Well | Yes | Yes**** |

*Some processes recycle compost as a bulking agent.
**The sand bed might be considered a bulking agent.
***Includes volatile solids only.
****No experimental work has been done at this time. The process is expected to work, but at a reduced rate compared to biological sludge.

Table I shows a comparison of the two most used methods of composting and normal landfarming and high rate landfarming. The high rate landfarm has advantages over aerated pile composting and normal landfarming. Any process comparison is of course highly dependent on the specific site. The advantages of high rate landfarming over composting in a closed reactor are as follows:

1. The sand in the high rate reactor is the bulking agent. However, sand is cheaper and more readily available than woodchips, the most commonly used composting bulking agent.

2. The solids reduction is greater than that of a closed reactor compostor, especially if water loss is considered.

3. Since the solids reduction is greater, solids blowdown will be necessary once or twice a year, thus reducing hauling and disposal costs.

4. Dewatering of the feed sludge is limited to thickening to 3–4 wt % solids, if at all, as compared with 12–20 wt % required for composting.

5. It has been demonstrated that thermophilic bacteria do not degrade hydrocarbons more readily than mesophilic bacteria and that there is no advantage to composting oily sludges over ambient biological degradation such as would take place in the high rate landfarm.

EXAMPLE 1

Experimental work was conducted on a pilot scale high rate reactor and in a sand column in the laboratory. These experiments were conducted to compare the difference in biosludge treatment between a pressurized and non-pressurized system.

The pilot scale high rate reactors consisted of a plywood box about four feet wide, eight feet long, and four feet deep. The bottom of the reactors formed a shallow trough which sloped down toward the outlet of the collection pipes which were perforated within the reactors. The perforated pipes were covered with about one foot of pea gravel at the deeper ends. The pea gravel was then covered with non-woven Fibretex Grade 150 polypropylene fabric (Crown Zellerbach, Camas, WA). About two feet of No. 4 sand (used for sandblasting) was placed on top of the fabric. The sludge was placed on top of the sand, allowed to dewater for a period of up to a day, and was rototilled into the sand with a 5-hp garden tiller. The sludge was waste activated sludge which had been stored in a pond which receives sludge from the secondary clarifier of the activated sludge unit. This sludge contained solids ranging from about 17% to about 70% by weight, thus the sludge was much more concentrated than the typical waste activated sludge which contains about one percent solids. Since the sludge had undergone anaerobic digestion for a long period of time (sludge had been added to the pond for about seven years), the sludge in the pond was more stable than the original activated sludge. After tilling, the covers were placed on the reactors and sealed with silicone caulking. A blower (American Standard Size A, ⅛ hp) supplied air to the reactors through 3-inch diameter galvanized steel ducts with dampers via a tee. Reactor 1 served as the test reactor in which the surface of the bed was pressurized to about 1.5 to 2 inches of water as measured by a manometer via a tube connected to the reactor above the bed. Reactor 2 served as the control in which no pressurization was maintained. To insure that fresh air was present over the control bed without having it pressurized, air from the blower was allowed to vent from the reactor via a three-inch duct fitted with a damper.

The reactors were sampled for water (percent of total sample weight) and volatile solids (percent of dry weight) usually every week. The percent oxygen in the beds was measured during the first weeks of operation by inserting a $\frac{3}{8}$-inch stainless steel tube through holes in the sides of the reactors into the center of the bed and pumping the air via a rubber bulb into a J-W oxygen indicator Model K (Bacharach Instrument Co., Pittsburgh, PA).

The process was run for a period of about seven months. The data generated are presented in Table II.

During about the first three months, sludge was applied to each reactor at the maximum rate which the non-pressurized control reactor would accept. During this period, the control reactor became wet and progressively more difficult to till. The pressurized test reactor tilled well and could have accepted more sludge. The control reactor became odorous and dark, typical of anaerobic decay, although the mass transfer rate into the bulk of wet sludge-sand was sufficient to deplete the oxygen to a low concentration of only 12 percent. The test reactor bed remained friable for about 5 months with the higher sludge loadings, and the concentration of 21 percent found in the air. On day 114 the control reactor was pressurized and the bed began to improve in ease of tilling. As the weather became cooler, the test reactor also had to be loaded less frequently due to the wetness of the bed (after Day 151, Jan. 16, 1982 in Port Arthur, Texas).

After the tests, the depths of incorporation of sludge in the bed were determined to be 8.4 inches in the test reactor and 10.75 inches in the control reactor. The bulk density of the beds was 1.1 g/cc. The total volatile solids applied to the test reactor was 642 lbs. (417.5 lbs. before one third of bed was discharged) and to the control reactor was 268 lbs. Using these data, the calculated percent volatile solids in the test reactor was 21.0 and 13.3 in the control reactor as compared with measured values of 13.9 and 9.5, respectively, at the end of the test.

Land treatment, when conducted properly, is an environmentally sound method of disposal of organic waste. A problem can arise from the application of high water content sludges. Excessive water fills the soil pores, thus lowering the transport of oxygen into the soil. The decomposition rate decreases and odors can be generated by anaerobic decay. This odor problem has prevented the landfarming of biological sludges at the Neches Butane Joint Wastewater Treatment Plant. To further study the effectiveness of the High Rate Reactors, Neches Butane sludge was added to both reactors.

The control reactor (Reactor 2) was emptied down to fresh sand. Additional sand was added to build the bed back to its original depth. Reactor 1 was left intact from the previous test run. On day 287, biosludge from Neches Butanes's secondary clarifier was added to both reactors. The reactors drained well and were tilled the following day. Both reactors were maintained with a pressure of 1.5–2.0 inches of water. After 6 applications of biosludge over 2 months, water began accumulating in the previously aged reactor, Reactor 1. Reactor 1 with a previous buildup of organic matter, did not dry as quickly as Reactor 2, which was a fresh sand bed. Reactor 1, like Reactor 2, remained a completely aerated bed and neither reactor had any odor problems. Reactor 2 continued to dry and till well through the test period (Day 360).

TABLE II

SUMMARY OF ANALYTICAL DATA ON SAND BEDS AND SLUDGE

| | Reactor 1 Bed | | | | Reactor 2 Bed | | | | Sludge Added | |
|---|---|---|---|---|---|---|---|---|---|---|
| Time, Days | % H$_2$O | % Volatiles | Volume Sludge Added, Gal. | % Oxygen | % H$_2$O | % Volatiles | Volume Sludge Added, Gal. | % Oxygen | % H$_2$O | % Volatiles |
| 0 | 22.2 | 4.5 | 75 | | 21.6 | 3.5 | 75 | | 56.5 | 27.0 |
| 10 | 11.4 | 2.1 | | 20 | 15.1 | 2.3 | | 15 | | |
| 17 | 9.2 | 1.8 | | | 12.4 | 2.3 | | | | |
| 31 | 13.6 | 3.3 | 25 | 21 | 17.8 | 3.4 | 25 | 19 | 56.5 | 27.0 |
| 37 | 11.7 | 3.9 | | 21 | 16.0 | 3.9 | 12 | | | |
| 51 | 15.5 | 3.8 | 25 | 21 | 21.3 | 4.5 | 25 | 14 | 56.5 | 27.0 |
| 59 | 11.4 | 3.4 | | 21 | 19.4 | 5.5 | | 13 | | |
| 65 | 10.7 | 4.4 | 25 | 21 | 23.0 | 6.1 | 25 | 14 | 35.5 | 6.9 |
| 72 | 17.2 | 7.0 | 25 | 21 | 20.1 | 7.0 | 25 | 15 | 52.9 | 22.9 |
| 79 | 13.4 | 4.3 | | 21 | 23.1 | 6.4 | | 16 | | |
| 87 | 15.9 | 7.1 | 25 | 25 | 23.3 | 10.2 | 25 | | 34.2 | 34.2 |
| 93 | 18.6 | 8.4 | 25 | | 27.2 | 8.9 | | | 38.5 | 56.1 |
| 99 | 19.8 | 13.7 | 25 | | 24.7 | 9.9 | | | 48.1 | 45.5 |
| 107 | 15.2 | 10.4 | 25 | 21 | 21.7 | 7.7 | | 20 | 37.2 | 15.1 |
| 114 | 19.1 | 6.1 | 25 | | 21.0 | 6.4 | | | 30.0 | 22.5 |
| 121 | 13.5 | 8.9 | | | 20.6 | 6.5 | | | | |
| 121 | 19.1 | 6.6 | 25 | | | | | | 30.0 | 22.5 |
| 135 | 15.8 | 12.0 | | | 20.3 | 8.2 | | | | |
| 142 | 13.7 | 11.7 | | | 18.6 | 7.6 | | | | |
| 150 | 9.9 | 12.2 | | | 15.7 | 7.3 | | | 82.6 | 62.0 |
| 151 | 17.5 | 16.7 | 25 | | 14.9 | 8.7 | | | | |
| 158 | 13.9 | 17.0 | | | 14.7 | 8.8 | | | | |
| 158 | 19.3 | 14.3 | 15 | | | | | | 82.6 | 62.0 |
| 164 | 19.4 | 14.3 | | | 12.8 | 8.5 | | | | |
| 171 | 16.1 | 15.4 | | | 12.0 | 6.1 | | | | |
| 178 | 14.1 | 11.5 | 15 | | 15.5 | 9.2 | 15 | | 68.2 | 21.5 |
| 179 | 21.9 | 10.9 | | | | | | | | |
| 186 | 18.5 | 11.5 | | | 15.1 | 8.1 | | | | |
| 206 | 12.7 | 12.8 | 15* | | 13.9 | 9.9 | 15* | | 100 | |
| 283 | 17.7 | 13.9 | | | 17.4 | 9.1 | | | | |

Reactor 1 Notes

Days 0–151.     Bed generally tilled well.

TABLE II-continued

| | |
|---|---|
| Day 135. | One-third of the bed containing sludge was discarded due to the increase in height of the bed in the reactor. |
| Day 151. | Bed became sticky. |
| Day 158. | Bed tilled well before sludge addition, but not well after addition. |
| Day 164. | Bed was still wet. |
| Day 171. | Bed was wet, but tilled fairly well. |
| Day 179. | Bed was wet and hard to till |
| Day 206. | Sampled before water added. Too wet to till. |
| Day 216. | Bed was wet and hard to till. |
| Reactor 2 Notes | |
| Days 31 and 37. | Wet clumps formed. |
| Day 51. | Bed was very wet and hard to till. |
| Days 72 and 87. | Bed was very wet, odorous, and hard to till. |
| Day 93. | Bed was too wet to till. |
| Day 99. | Bed was hard to till. |
| Day 114. | Bed was wet, odorous, and hard to till. Pressurization was started. |
| Days 121-142. | Bed continues to improve. |
| Days 151 and 158. | Bed tilled well. |
| Day 178. | Too wet to till after sludge added. |
| Day 186. | Wet, but tilled fairly well. |
| Day 206. | Sampled before water added. Too wet to till. |
| Day 216. | Wet, but tilled fairly well. |

EXAMPLE 2

Concurrent with the pilot unit study of Example 1, experiments were also performed in the laboratory to study the application of high water content sludges. The surface application of waste activated sludge to a sand bed eventually clogs the surface pores which limits the sludge's dewatering rate. By tilling (rototilling) the sludge into the sand, the surface is renewed, allowing further sludge addition. This study was conducted to determine the quantity of waste activated sludge that could be applied before mixing into the sand was required.

Two laboratory columns were constructed. Sand was taken from the pressurized test reactor (day 94) and loaded into both reactors. Biosludge was added to both columns, first at atmospheric pressure, and then with a slight airspace pressure of 1-2 inches of water. It was found that the columns could receive 0.24 lbs. (dry wt.) biosludge/ft$^2$ loading before any clogging would occur. This is equivalent to a 6.4 inch depth application of 0.7% solids.

The 6.4 inches of biosludge was applied to the columns in a single large dose. Applying the biosludge at a slower, controlled rate could allow a higher loading of biosludge before clogging of the surface pores occurs. A higher loading rate would increase the time before the surface would need to be renewed by tilling (rototilling).

Laboratory soil columns were also used to simulate a profile through the sand bed under more closely controlled conditions. The pressure drop and oxygen uptake through the columns was determined.

A sand column was loaded with 6.5% (dry wt.) pit biosludge, saturated with water, and operated with different air space pressures. At the low air flow of 14 ml/min, no pressure drop was found down the column. A pressure drop of only 0.25 inch operated 200 ml/min air flow.

The sand column was then loaded with 11.8% (dry wt.) biosludge. When water was then added to saturate the sand bed, clogging occurred, preventing drainage and air flow down the column.

Upon reloading both columns with 9% (dry wt.) biosludge, no pressure drop was found down the column at 75 ml/min flow. At a sand bed depth of 20 inches, there was only a 0.6 inch of water back pressure operating at 615 ml/min air flow.

The two sand columns were loaded with 9% biosludge and were operated at different air flows. The oxygen concentration down the columns was measured by a J-W Model K Oxygen Indicator. Typical results in Table III show the decline in the percent oxygen at different depths.

TABLE III

OXYGEN IN SAND COLUMNS CONTAINING 9% BIOSLUDGE

| | Oxygen, % | |
|---|---|---|
| Column Depth, in. | Column 1 (25 ml/min air) | Column 2 (75 ml/min air) |
| 0 | 21 | 21 |
| 2 | 18 | 21 |
| 8 | 17.5 | 20 |
| 14 | 15.5 | 18 |
| 20 | 13 | 16 |

Even at the low pressures used, the flow of air was sufficient to provide enough oxygen for microbial activity in the soil for the sludge tested as long as complete clogging does not occur.

Experiments were also performed on the pilot scale high rate sludge reactors to study the beneficial effects of pressurization for the ventilation down the soil profile. During the study period, the pressurized test reactor showed complete ventilation (21% O$_2$) down the soil profile. Over a three-day period (Day 107-110) the pressure was removed from the reactor to determine its effect on the oxygen levels down the sand bed. As shown in Table IV, oxygen levels in the sand bed decreased when the bed was not pressurized. The oxygen levels rapidly returned to 21% after pressure was reapplied.

TABLE IV

OXYGEN PROFILE OF PRESSURIZED REACTOR

| Depth, in. | Percent Oxygen | | | | |
|---|---|---|---|---|---|
| | 4 | 7 | 13 | 19 | 23 |
| Day 107 9:00 AM Pressure | 21 | 21 | 21 | 21 | 21 |
| Day 107 11:00 AM No Pressure | 21 | 21 | 20 | 20 | 20 |
| Day 107 3:00 PM No Pressure | 21 | 21 | 18 | 17 | 18 |
| Day 110 1:30 PM No Pressure | 10 | 13 | 9 | 7 | 8 |
| Day 110 3:30 PM Pressure | 21 | 21 | 21 | 21 | 21 |

EXAMPLE III

The demonstration unit proposed consists of a sand bed overlaying a drainage system and housed in an inflatable building as shown in FIGS. 1-4. The 70 ft. radius inflatable building will be built on a circular earthen levee and anchored to a concrete ring. The drainage system consists of perforated PVC pipe in a gravel bed with a membrane liner underneath to collect the leachate. A drainage fabric will cover the drainage system, with the 2 ft depth sand bed placed on top. The biosludge will be sprayed onto the sand bed through several nozzles placed in the center of the sand bed.

A breakdown for materials and construction is provided in Table V.

During the demonstration, an important task will be to determine the optimum loading schedule. Based on the rate the applied biosludge will dewater, a balance between frequency of application and quantity of sludge applied will be developed. A tilling routine will also be established. The accumulation of refractory organic matter and inorganic fines will result in an increase in bed volume, an increase in water holding capacity, and a decrease in sand bed ventilation. The frequency at which the bed contents requires a blow-down will be determined.

TABLE V

MATERIAL ESTIMATES FOR DEMONSTRATION UNIT HIGH RATE REACTOR

1. Inflatable Building - Air-Tech Industries
2. Concrete - 60 yd$^3$
3. Sand - 336 yd$^3$ Sand
4. Gravel - 210 yd$^3$
5. Membrane Lining - Watercover Co., Inc. 6000 ft$^2$, 36 mil CPER.
6. Drainage Fabric - Grade 200 Fibretex Geotextile Fabric - Crown Zellerbach - 6000 ft$^2$
7. Portable Flue Gas Analyzer - Teledyne Model 980
8. Velometer - Alnor
9. Flowmeter - Flow accumulator - Horizon
10. Electrical lines
11. Tilling System - Tractor and tiller
12. PVC Drainage Pipe 4" PVC 2700 ft,
13. Polypropylene Pipe 600 ft
14. Pumps - Tentative. Actual pumps required dependent on exact reactor location
15. Sprinkler Head and Nozzles - Nelson Irrigation Co.

ANALYTICAL

The quality of the sand bed material will be monitored by weekly determinations of percent volatile solids, solvent extractables, and water. At the beginning of the demonstration and on a monthly basis, the sand bed material will be analyzed for pH, conductivity, water holding capacity, texture, bulk density, cation exchange capacity, U.S.-E.P.A. Toxicity Extraction Procedure metals, total concentration of selected metals, and total Kjeldahl nitrogen. In addition, extractable, soluble, and exchangeable calcium, magnesium, sodium, potassium, and ammonium along with soluble nitrate, nitrite, phosphate, sulfate, and chloride will be determined. These analyses will give insight into the biodegradation process and determine the status of the material for final disposal.

The sludge applied will be tested weekly for total and volatile suspended solids, solvent extractables, total Kjeldahl nitrogen, zone settling velocity, and sludge volume index. Sludge filtrate will be analyzed for TOC, ammonia, nitrite, nitrate, and phenol. The quantity of sludge applied will be recorded.

Leachate collected in the drainage system will be analyzed weekly for TOC, suspended solids, BOD, conductivity, phenol, ammonia, nitrite, and nitrate. The volume of leachate collected will be recorded.

The air inside the inflated building will be monitored daily for oxygen, explosivity, and odor as a safety measure. The temperature and pressure inside and outside of the building will be recorded. Ventilation of the sand bed will be measured by determining oxygen profiles through the bed and the oxygen concentration and volume of air collected through the drainage system.

The principle of the invention and the best mode contemplated for applying the principle have been described. It is to be understood that the foregoing is illustrative only and that other means and techniques can be employed without departing from the true scope of the invention defined in the following claims.

What is claimed is:

1. A high rate reactor for dewatering and aerobically biodegrading low solids content biosludge, the reactor comprising a closed air tight vessel and a bed positioned within the vessel wherein the vessel comprises:

a cover which is constructed so as to be air supported and is fastened and sealed to a frame by fastening means and sealing means to form an essentially air tight seal;

an air supply means for supplying air to support the cover and to supply air to the bed; the frame is air impermeable and horizontally rigid;

a base which is water impermeable, oil resistant, fastened and sealed to the frame by fastening means and sealing means to form an essentially air tight seal and the base is formed to collect water from the bed; and wherein the bed comprises:

granular matter of mesh sufficient to retard the passage of biosludge and sufficient to allow the passage of supplied air and water therethrough.

2. A high rate reactor for dewatering and aerobically biodegrading low solids content biosludge, the reactor comprising a closed air tight vessel and a bed positioned within the vessel wherein the vessel comprises:

a cover which is constructed so as to be is air supported and is fastened and sealed to a frame by fastening means and sealing means to form an essentially air tight seal;

an air supply means for supplying air to support the cover and to supply air to the bed; the frame is air impermeable and horizontally rigid;

a base which is water impermeable, oil resistant, fastened and sealed to the frame by fastening means and sealing means to form an essentially air tight seal and the base is formed to collect water from the bed; water removal means for removing water collected at the base;

means for introducing low solids content biosludge into the vessel;

tilling means for tilling biosludge into the bed;

wherein the bed comprises:

granular matter of mesh sufficient to retard the passage of biosludge and sufficient to allow the passage of supplied air and water therethrough.

3. A high rate reactor for dewatering and aerobically biodegrading low solids content biosludge, the reactor comprising a closed, air tight vessel and a bed positioned within the vessel the vessel comprising a cover fastened to an encircling frame and a base fastened to the encircling frame wherein:

A. in the vessel:

the cover comprises an air supported cover fastened and sealed to the frame by fastening means and sealing means to form an essentially air tight seal;

air supply means for supplying air for supporting the cover and for supplying air to the bed in excess of the stoichiometric amount required for complete biodegradation and for inducing a downward flow of water to the base;

the frame is air impermeable and horizontally rigid;

the base is a water impermeable, oil resistant membrane liner, fastened and sealed to the frame by fastening means and sealing means to form an essentially air tight seal and the base is formed to collect water from the bed for removal by water removal means;

water removal means for removing water collected at the base;

means for removing dewatered, biodegraded solids;

means for introducing low solids content biosludge into the vessel;

means for distributing low solids content biosludge essentially evenly over the top of the bed;

tilling means for tilling distributed biosludge into the bed; and

B. in the bed:

granular matter of mesh sufficient to retard the passage of biosludge and sufficient to allow the passage of supplied air and water therethrough.

4. A high rate reactor for dewatering and aerobically biodegrading low solids content biosludge, the reactor comprising a closed, air tight vessel and a bed positioned within the vessel the vessel comprising a cover fastened to an encircling frame and a base fastened to the encircling frame wherein:

A. in the vessel:

the cover comprises an air supported cover fastened and sealed to the frame by fastening means and sealing means to form an essentially air tight seal;

air supply means for supplying air for supporting the cover and for supplying air to the bed in excess of the stoichiometric amount required for complete biodegradation and for inducing a flow of water to the base;

the frame is air impermeable and horizontally rigid;

the base is a water impermeable, oil resistant membrane liner, fastened and sealed to the frame by fastening means and sealing means to form an essentially air tight seal and the base is formed to collect water from the bed for removal by water removal means;

water removal means for removing water collected at the base;

means for removing dewatered, biodegraded solids;

means for introducing low solids content biosludge into the vessel;

means for distributing low solids content biosludge essentially evenly over the top of the bed;

tilling means for tilling distributed biosludge into the bed; and

B. in the bed:

a first layer which is a top layer comprising biosludge which is tilled with granular matter of diameter 0.05 to 0.5 mm;

a second layer directly beneath the first layer comprising granular matter of diameter 0.5 mm to 1 mm; and a third layer directly beneath the second layer comprising granular matter of diameter 1 mm to 5 mm.

5. A high rate reactor for dewatering and aerobically biodegrading low solids content biosludge, the reactor comprising a closed, air tight vessel and a bed positioned within the vessel the vessel comprising a cover fastened to an encircling frame and a base fastened to the encircling frame wherein:

A. in the vessel:

the cover comprises an air supported cover fastened and sealed to the frame by fastening means and sealing means to form an essentially air tight seal;

air supply means for supplying air for supporting the cover and for supplying air to the bed in excess of the stoichiometric amount required for complete biodegradation and for inducing a downward flow of water to the base;

the frame is air impermeable and horizontally rigid;

the base is a water impermeable, oil resistant membrane liner, fastened and sealed to the frame by fastening means and sealing means to form an essentially air tight seal and the base is formed to collect water from the bed for removal by water removal means;

water removal means for removing water collected at the base;

means for removing dewatered, biodegraded solids;

means for introducing low solids content biosludge into the vessel;

means for distributing low solids content biosludge essentially evenly over the top of the bed;

tilling means for tilling distributed biosludge into the bed; and

B. in the bed:

a first layer which is a top layer comprising biosludge distributed across the top of the bed which is tilled with a second layer;

a second layer directly beneath the first layer comprising granular material of diameter 0.05 mm to 0.5 mm;

a third layer directly beneath the second layer, comprising means for retarding the passage of granular matter and allowing the passage of water to a fourth layer; and a fourth layer comprising granular matter of diameter 1 mm to 5 mm and into which is positioned water removal means.

6. The reactor of claim 5 wherein the granular matter of the second layer comprises sand and the granular matter of the fourth layer comprises gravel.

7. The reactor of claim 5 comprising air heating means.

* * * * *